(12) United States Patent
Thomson et al.

(10) Patent No.: US 6,614,025 B2
(45) Date of Patent: Sep. 2, 2003

(54) RADIATION SENSOR AND DOSIMETER INCORPORATING SAME

(75) Inventors: Ian Thomson, Nepean (CA); Andrew Hartshorn, Kanata (CA)

(73) Assignee: Thomson & Nielsen Electronics Ltd., Nepean (CA)

( * ) Notice: Subject to any disclaimer, the term of this patent is extended or adjusted under 35 U.S.C. 154(b) by 4 days.

(21) Appl. No.: 09/796,795

(22) Filed: Mar. 2, 2001

(65) Prior Publication Data

US 2001/0032933 A1 Oct. 25, 2001

Related U.S. Application Data

(60) Provisional application No. 60/192,568, filed on Mar. 28, 2000.

(51) Int. Cl.$^7$ .................................................. G01T 1/24
(52) U.S. Cl. ................................................. 250/370.01
(58) Field of Search .................... 250/370.01; 257/701, 257/787; 600/436

(56) References Cited

U.S. PATENT DOCUMENTS 4,859,853 A * 8/1989 Kronenberg ........... 250/370.07
5,444,254 A    8/1995 Thomson

OTHER PUBLICATIONS

Ramaseshan Ramani et al., "Clinical dosimetry using MOS-FETs", Int. J. Radiation Oncology Biol. Phys., vol. 37, No. 4, 1997, pp. 959–964.

* cited by examiner

Primary Examiner—Constantine Hannaher
Assistant Examiner—Shun Lee
(74) Attorney, Agent, or Firm—Thomas Adams

(57) ABSTRACT

In a dosimeter probe comprising a semiconductor diode or a field effect transistor for monitoring levels of radiation during medical procedures, such as the treatment of tumors, the transistor or diode is fabricated epitaxially upon a surface of a substrate and a dummy die, i.e., a slab of material similar to that of the substrate, is positioned adjacent the substrate surface so as to overlie an active region of the transistor or diode and a relatively large area of the substrate surrounding the active region. The arrangement is such that, whatever the direction from which the radiation is incident upon the active region, its path through the device before arriving at the active region will have similar characteristics to the path the radiation takes upon leaving the active region.

19 Claims, 3 Drawing Sheets

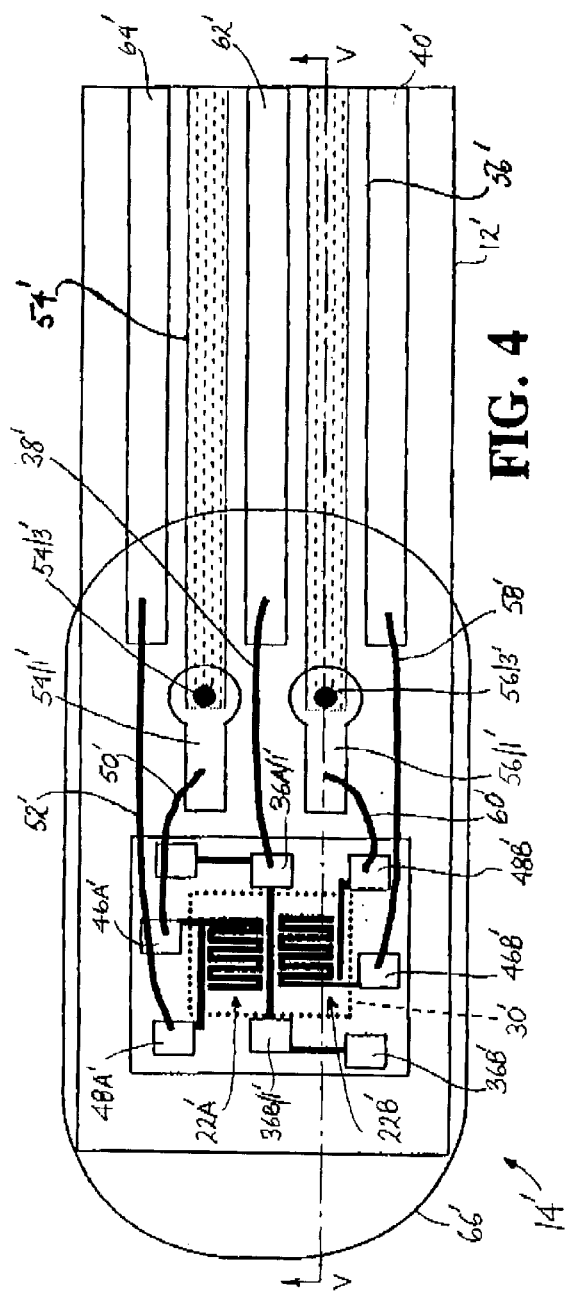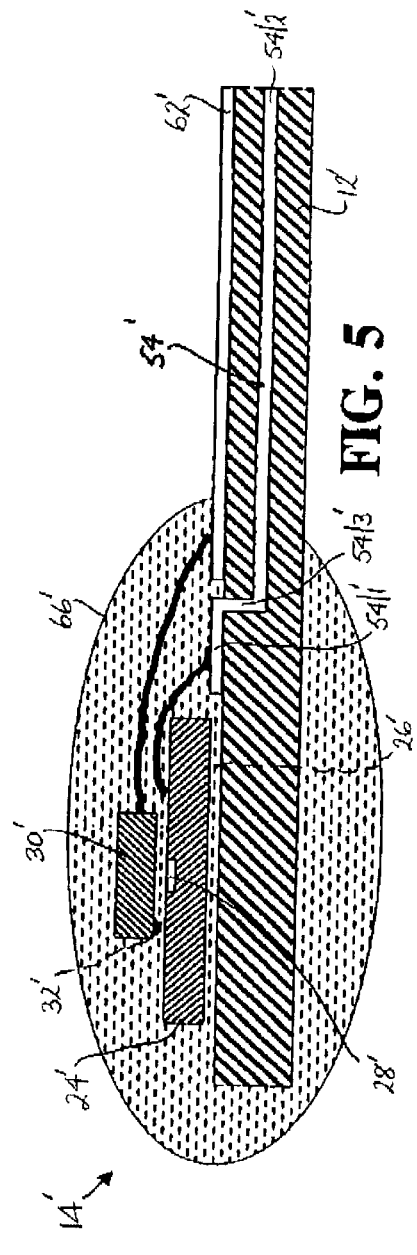

RADIATION SENSOR AND DOSIMETER INCORPORATING SAME

This application claims priority from U.S. provisional patent application No. 60/192,568 filed on Mar. 28, 2000.

BACKGROUND OF THE INVENTION

1. Technical Field

The invention relates to radiation sensors of the kind in which a semiconductor device, such as a semiconductor diode or a field effect transistor, is used to detect radiation. The invention is especially, but not exclusively applicable to radiation sensors for dosimeter probes used to monitor levels of radiation during medical procedures, such as the treatment of tumours, and to dosimeters incorporating such sensors. The invention also comprehends semiconductor radiation sensors per se whether for use in such dosimeter probes or elsewhere.

2. Background Art

Dosimeter probes having semiconductor radiation sensors are used routinely in radiotherapy clinics to measure the radiation dose given to patients. The most commonly used electronic patient dosimeters use probes having silicon diodes or silicon metal oxide semiconductor field effect transistors (MOSFETs), otherwise known as an insulated gate field effect transistors (IGFETs), as radiation sensors. For example, U.S. Pat. No. 5,444,254 (Thomson) issued Aug. 22, 1995 discloses a dosimeter probe comprising a radiation sensor in the form of a pair of MOSFETs formed epitaxially on a silicon substrate which is bonded to one end of a flexible electrical connector. A meter attached to the other end of the flexible connector measures the level of radiation and total accumulated radiation. The flexible connector allows the sensor to be inserted, via a catheter, to a position adjacent a site being irradiated.

Whether the radiation sensor is a diode or a FET, it is generally planar and the active detection region is a thin layer, typically less than 1 $\mu$m thick, on the surface of a relatively thick silicon substrate, typically about 500 $\mu$m thick. In the case of a diode sensor, the thin detection layer is the depletion region of a zero-biased PN junction, which usually has an area of several $mm^2$. Ionizing radiation passing through the silicon junction area during exposure creates charge carriers which are detected as a current in external circuitry. This current is proportional to the dose rate of the incident radiation and the external circuitry measures the current and integrates it over the exposure time to determine the dose.

In the case of a MOSFET radiation sensor, the thin detection layer is the silicon dioxide forming the gate of the MOSFET. Ionizing radiation passing through the gate oxide generates charge, which is trapped. The trapped charge changes the threshold voltage of the MOSFET and the external circuitry determines the change in the threshold as a measure of the radiation dose absorbed by the MOSFET. Typically, the area of a MOSFET radiation sensor is 0.2 mm square on a die that is 1 mm square.

In an article entitled "Clinical dosimetry using MOSFETs", Int. J. Radiation Oncology Biol. Phys., Vol. 37, No. 4, 1997, pp. 959–964, Ramaseshan Ramani et al. reported that the sensitivity of a MOSFET sensor of the aforementioned kind can vary by as much as 28 percent according to the angle of incidence of the radiation. While such a radiation sensor may perform satisfactorily in most situations, such anisotropic sensitivity limits its usefulness with new treatment techniques such as intensity modulated radiation therapy (IMRT), conformal radiation therapy and brachytherapy, all of which direct the radiation onto the tumour and the radiation sensor, during treatment, from angles which can vary over a wide range. IMRT, for example, uses radiation beams which are directed at the tumour (and adjacent sensor) by rotating the radiation source through plus and minus 135 degrees. In the case of brachytherapy, seeds of radioactive material are implanted into the tumour in a non-uniform array and the radiation sensor is positioned within the array. It is not practical to determine the orientation of the radiation sensor once it has been inserted, so anisotropic sensitivity of the radiation sensor can lead to inaccurate readings. Even with other forms of treatment, which use a single, fixed radiation angle, it might be desirable to monitor the radiation received by adjacent organs, but this cannot be done accurately in view of the anisotropic sensitivity and the lack of information about the orientation of the radiation sensor.

Anisotropic sensitivity may be exacerbated by the packaging of the sensor, specifically the use of so-called "build up" material, usually aluminum or brass, around the die. Permanently adding build-up during manufacture would mean that a different dosimeter probe would be required for each photon energy range (e.g. 6-MV, 10-MV, 18-MV) and electron energy level. It is preferable, therefore, to package MOSFET radiation sensors with a minimum of build-up material around the die so that the physicist can add build-up according to the energy at which the dosimeter probe is to be used, allowing the same dosimeter probe to be used for all photon and electron energy ranges. The build-up also contributes to the anisotropic response to radiation. Radiation sensors which use diodes rather than MOSFETs are even more likely to exhibit anisotropic sensitivity because such diodes usually are packaged with more "build-up" material around them.

BRIEF SUMMARY OF THE INVENTION

The present invention seeks to overcome or at least mitigate these disadvantages of known radiation sensors.

According to a first aspect of the present invention, a radiation sensor comprises an active semiconductor device fabricated upon a surface of a substrate and a body of semiconductor material positioned adjacent said surface but insulated therefrom by a thin film of insulating material, so as to overlie an active region of the semiconductor device, the body of semiconductor material being dimensioned to circumscribe the active region and an area of the substrate surface surrounding the active region, such that, whatever the direction from which the radiation is incident upon the active region, its path through the device before arriving at the active region will have similar characteristics to the path the radiation takes upon leaving the active region.

According to a second aspect of the present invention, a dosimeter probe comprises an elongate flexible conductor strip having a radiation sensor at one end, a connector at an opposite end, and a plurality of conductors connecting the radiation sensor to the connector, wherein the radiation sensor comprises an active semiconductor device fabricated upon a surface of a substrate attached to the flexible conductor strip and a body of semiconductor material positioned adjacent said surface but insulated therefrom by a thin film of insulating material, so as to overlie an active region of the semiconductor device, the body of semiconductor material being dimensioned to circumscribe the active region and an area of the substrate surface surrounding the active region, such that, whatever the direction from which the radiation is incident upon the active region, its path through the device before arriving at the active region will have similar characteristics to the path the radiation takes upon leaving the active region.

Preferably, in embodiments of either aspect of the invention, the arrangement is such that, whatever the direction from which the radiation is incident upon the active region, its path through the device before arriving at the active region will have similar characteristics to the path the radiation takes upon leaving the active region.

Such a requirement can be met if the composition of the material all around the semiconductor device, and especially on opposite sides of the planar surface and the depletion layer or radiation detection layer, is generally symmetrical for a significant distance each side of the active region.

Hence, it is preferable for the spacing between the body and the juxtaposed substrate surface to be a minimum, for example a few thousandths of an inch, and for the thickness of the body to be substantially the same as the thickness of the substrate.

The radiation characteristics of the material from which the body is made preferably are similar to those of the material from which the substrate is made, so as to make backscatter substantially the same in every direction. Such characteristics may include atomic number. Allowance may also be made for conductors, typically of copper, in the radiation path.

The body need not be connected electrically to the substrate or to the semiconductor device.

The semiconductor device may be a transistor or a diode but, in preferred embodiments of the invention, comprises a MOSFET.

BRIEF DESCRIPTION OF THE DRAWINGS

The foregoing and other objects, features, aspects and advantages of the present invention will become more apparent from the following detailed description of preferred embodiments of the invention, taken in conjunction with the accompanying drawings, in which:

FIG. 4 is a simplified plan view of a modified radiation sensor;

FIG. 5 is a simplified cross-sectional view of the modified radiation sensor taken on line V—V of FIG. 4;

DETAILED DESCRIPTION OF PREFERRED EMBODIMENTS OF THE INVENTION

Figure 1:
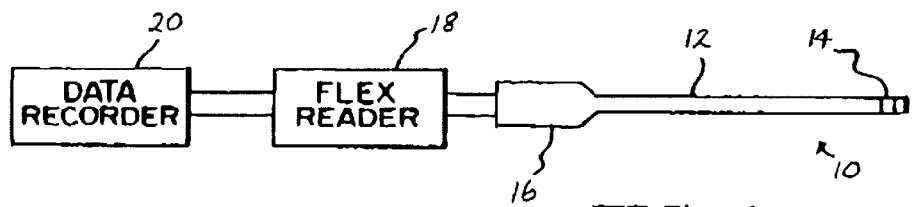
FIG. 1 is a plan view of a dosimeter comprising a dosimeter probe coupled to a reader and a data recorder.

In the drawings, corresponding elements in different Figures have the same reference numbers, but with a prime if appropriate to show that there is a difference.

Referring now to FIG. 1, a dosimeter comprises a dosimeter probe 10 formed by a flexible conductor strip 12, typically a length of polyimide tape, having a radiation sensor 14 at one end and a connector 16 at its other end. The connector 16 is connected to a circuit 18 which monitors signals from the radiation sensor 14. A data recorder 20, conveniently a personal computer, connected to the circuit 18 records the signal levels over a period of time, enabling radiation dose to be calculated. Where the radiation sensor 14 is a MOSFET, the circuit 18 may also supply bias to the MOSFET via the flexible conductor 12 and monitor variations in its threshold voltage as a measure of the radiation to which it is exposed. The present invention is concerned only with the construction of the radiation sensor 14. Other parts of the dosimeter and its probe 10 can be of known construction, for example as described in the aforementioned U.S. Pat. No. 5,444,254 and the prior art mentioned therein. These documents are incorporated herein by reference.

Figure 2:
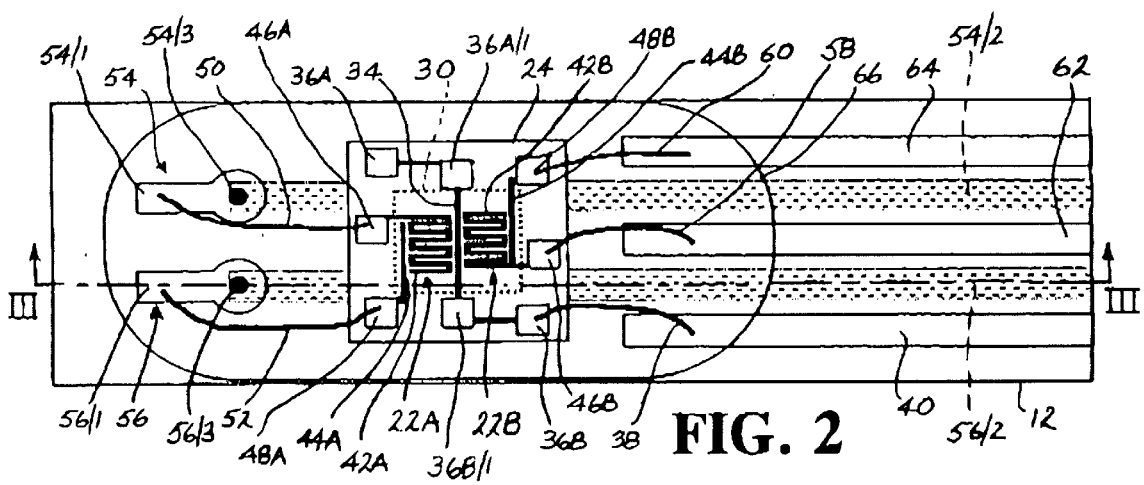
FIG. 2 is a plan view of a MOSFET radiation sensor according to a first embodiment of the invention.
Figure 3:
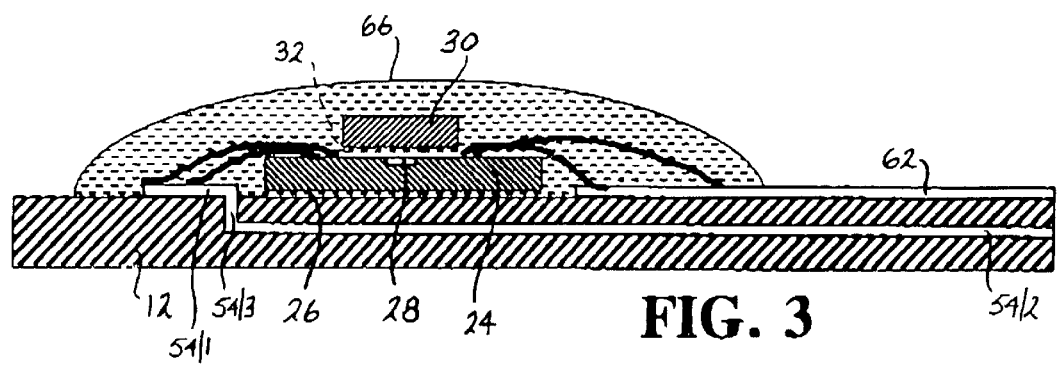
FIG. 3 is a simplified cross-sectional view of the radiation sensor taken on line III—III of FIG. 2.

Referring now to FIGS. 2 and 3, the radiation sensor 14 comprises a pair of MOSFETs 22A and 22B formed in one surface (uppermost in FIG. 3) of a silicon substrate 24 which is adhered to the flexible conductor strip 12 by a thin layer of epoxy resin adhesive 26, which also acts as an insulator. The area covered by the MOSFETs 22A and 22B constitutes an active region 28 of the detector, i.e., which is affected by the radiation being detected. A dummy die 30, namely a body of silicon similar to that forming the substrate 24, is adhered to the surface of the substrate 24 by a thin layer 32 of epoxy resin adhesive, which also acts as an insulator. (For clarity, FIG. 2 omits the dummy die 30, but its outline is shown by a dotted line). The epoxy resin layer 32 is as thin as practical, so as to minimize the spacing between the dummy die 30 and the underlying surface of the substrate 24. In plan, the dummy die 30 circumscribes the active region 28 and extends well beyond its perimeter.

As shown in FIG. 2, the MOSFETs 22A and 22B share a common source electrode 34 which extends between bonding pads 36A and 36B (via intermediate pads 36A/1 and 36B/1) at opposite sides of the active region 28. A bonding wire 38 connects source bonding pad 36B to a first conductor 40 of the flexible conductor strip 12. The drain and gate electrodes 42A and 44A, respectively, of MOSFET 22A are connected to bonding pads 46A and 48A, respectively. Bonding wires 50 and 52 connect bonding pads 46A and 48A to conductors 54 and 56, respectively. Likewise, the drain and gate electrodes 42B and 44B of MOSFET 22B are connected to bonding pads 46B and 48B, respectively, and bonding wires 58 and 60 connect pads 46B and 48B to conductors 62 and 64, respectively. Care is taken to keep the bonding wires away from the vicinity of the active area 28.

Conductors 40, 62 and 64 extend along the surface of flexible strip 12, terminating short of the substrate 24. Conductors 54 and 56, however, comprise first parts 54/1 and 56/1, respectively, which extend above the flexible strip 12 at its distal end and are connected to the bonding wires 50 and 52, respectively, and second parts 54/2 and 56/2, respectively, which extend within the flexible strip 12 and beneath the substrate 24 and are connected to the first parts 54/1 and 56/1 by plated-through holes 54/3 and 56/3, respectively.

As can be seen from FIGS. 2 and 3, the dummy die 30 is much larger in length and width than the active region 28 forming the MOSFETs, but not so large that it impedes bonding of the wires 38, 50, 52, 58 and 60 to the pads 36B, 46A, 48A, 46B and 48B, respectively.

The flexible conductor strip 12 may comprise polyimide of the kind marketed by Dupont Inc. under the trade name KAPTON. The conductors may be copper track plated with nickel and gold, and the bonding wires may be aluminum, Aluminium is preferred for the bonding wires because it has a relatively low density, as compared with gold, and also to keep the diameter as small as possible, for example, 0.001 inches.

The substrate 24, dummy die 30, and bonding wires 38, 50, 52, 58 and 60 are encapsulated in a generally hemispherical body 66 of the epoxy resin which is built up around them and the surrounding surface of the flexible strip 12.

The dummy die 30 is as close as practically possible to the active region 28 and its width and length are considerably larger than those of the active region 28. Consequently, the dummy die 30 "shields" the active region 28 so that the paths taken by radiation approaching and leaving the active region will have generally similar characteristics, regardless of the orientation of those paths. In a practical embodiment, the dimensions were as follows:

| | |
|---|---|
| Active region | 200 μm by 200 μm |
| Dummy die 30 | 350 μm wide, 350 μm long, 150 μm thick |
| Substrate 24 | 150 μm thick |
| Epoxy layer 26 | 25 μm thick |
| Epoxy layer 32 | 25 μm thick |
| Epoxy hemisphere 66 | about 200 μm thick above the substrate 24. |

Hence, the maximum thickness of the flexible strip 12 and hemispherical encapsulation 66 was about 1 mm.

If desired, a similar hemispherical build-up 66 could be provided on the other side of the flexible strip 12.

Although the sensitivity of the above-described radiation sensor 14 is more isotropic than previously known radiation sensors, the portions of the two conductors 54/2 and 56/2 which extend beneath the substrate 24 may affect the radiation sensitivity and make it somewhat anisotropic, especially when it is used with low energy radiation. It can be demonstrated that, when low energy radiation is used, the variation in sensitivity with respect to angle can be greater, perhaps by two or three times, than the variation when higher energy radiation is used. Also, with low energy radiation, there are certain angles at which the sensitivity changes quite significantly. FIGS. 4 and 5 illustrate an alternative radiation sensor 14' which is particularly isotropic even when used with lower energy radiation, for example, X-rays used in prostrate treatments.

The radiation sensor 14' is generally similar to that shown in FIGS. 2 and 3, so corresponding elements have the same reference numbers, but with a prime. The most important modification is that all of the conductors 40', 54', 62' and 64' terminate short of the substrate 24'. Thus, the first parts 54/1' and 56/1' of conductors 54' and 56' extend upon the surface of flexible strip 12' between the substrate 24' and the adjacent ends of surface conductors 40', 62' and 64', which are foreshortened appropriately. As before, the second parts 54/2' and 56/2' of the conductors 54' and 56', respectively, extend inside the flexible strip 12' to a position short of the substrate 24') and are connected to the first parts 54/1' and 56/1' by plated-through holes 54/3' and 56/3', respectively. Again, the layout is such that the bonding wires are kept away from the active area 28'.

An additional modification is that the substrate 24 is rotated through 90 degrees and some of the bonding pads connected to different conductors, so as to facilitate connection of the bonding wires without encroaching upon the active region, Hence, in FIG. 4, bonding wire 38' connects the common source electrode 36A/1' to conductor 62', while bonding wires 50', 52', 58' and 60' connect the bonding pads 46A', 48A', 46B' and 48B' to conductors 54', 64', 40' and 56', respectively.

A further modification is that the encapsulation 66' covers both sides nd the end of the flexible conductor strip 12'.

It should be noted that there is no metal in the vicinity of the active region 28' because none of the conductors extends beneath the active region 28'. Consequently, the sensitivity of the radiation sensor of FIGS. 4 and 5 is more uniformly isotropic, even when it is used with low energy radiation.

Figure 6:
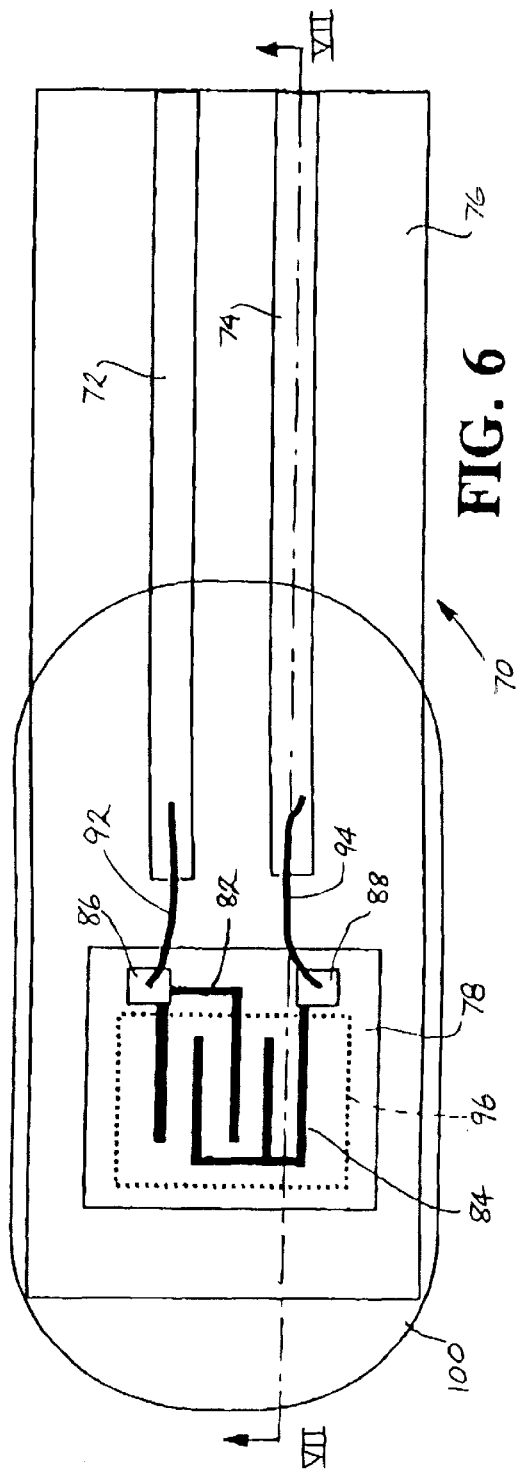
FIG. 6 is a simplified plan view of another embodiment of the invention, namely a diode sensor having a body of material positioned over its PN junction.
Figure 7:
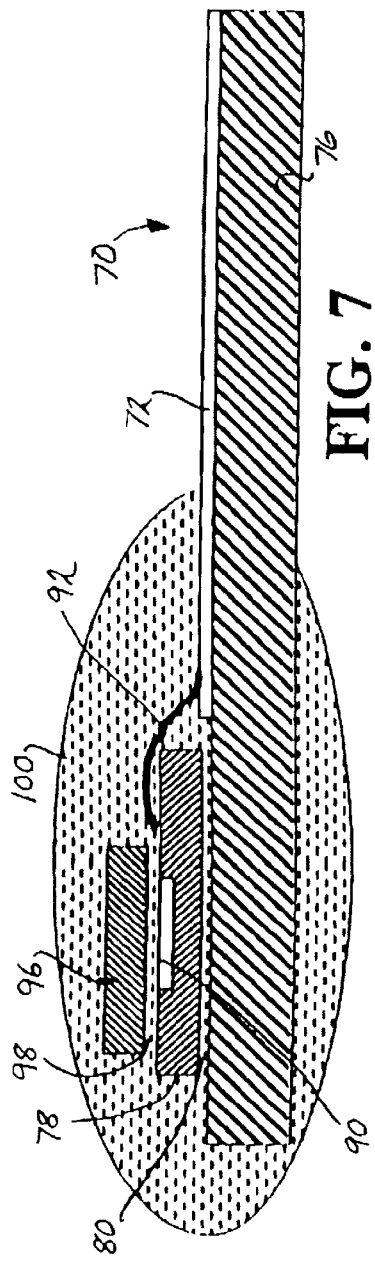
FIG. 7 is a simplified cross-sectional view of the sensor of FIG. 6.

FIGS. 6 and 7 illustrate a third embodiment of the invention which comprises a silicon diode rather than a pair of MOSFETs. Thus, the radiation sensor shown in FIGS. 6 and 7 comprises a flexible conductor strip 70 having two copper conductors 72 and 74 extending along the surface of a polyimide tape 76. One major surface (shown lowermost in FIG. 7) of a silicon substrate 78 is bonded to an end portion of the polyimide tape 76 by a thin layer of adhesive 80. An anode 82 and a cathode 84 of the diode are formed by metal deposition upon the other (uppermost as shown) surface of the substrate 78 and are connected to bonding pads 86 and 88, respectively. The anode 82 and cathode 84 comprise interdigitated electrode fingers which define an active region 90 of the diode, i.e., a region in which the effect of radiation will be detected. Bonding wires 92 and 94 connect the bonding pads 86 and 88 to conductors 72 and 74, respectively. A dummy die 96, i.e., a body of silicon similar to that forming the substrate 78, is adhered to the uppermost surface of the substrate 78, overlying the diode electrodes, by a second thin layer of epoxy adhesive 98 which also acts as an insulator. For greater clarity, FIG. 7 omits the dummy die 96, but its outline is shown in dotted lines. The dummy die 96 is significantly longer and wider than the active region 90, and as close to it as possible, so as to ensure that, as in the MOSFET embodiment of FIGS. 2 to 5, whatever the direction from which the radiation is incident upon the active region 90, the path taken by the radiation before arriving at the active region 90 and the path taken by the radiation upon leaving the active region 90 will have similar characteristics. The diode sensor is encapsulated in build-up material 100 which covers both sides and the end of the flexible tape 76.

As in the case of the MOSFET radiation sensor of FIGS. 4 and 5, the conductors 72 and 74 terminate well short of the active region 90 so as to optimize symmetry of the characteristics of the material around the active region 90.

It should be appreciated that, although the above-described embodiments comprise radiation sensors for dosimeters, the invention embraces radiation sensors for other applications. For example, instead of being attached to a flexible tape, the radiation sensor, whether diode or MOSFET based, could be packaged as a separate component with pins for connection to monitoring equipment. If an eight-pin dual-in-line packaging is used, the connections to the bonding pads of the MOSFETs could all be brought out separately and connected externally as desired.

Radiation sensors embodying the invention have more isotropic sensitivity than previously-known sensors and so provide better monitoring of radiation, especially when used with dosimeters of the kind used for monitoring radiation during medical treatment. Moreover, because the atomic numbers of the materials traversed by the radiation both before and after traversing the active region are the same, backscatter effects are reduced.

What is claimed is:

1. A radiation sensor comprising an active semiconductor device fabricated upon a surface of a substrate and a body of semiconductor material positioned adjacent said surface but insulated therefrom by a thin film of insulating material, so as to overlie an active region of the semiconductor device, the body of semiconductor material being dimensioned to circumscribe the active region and an area of the substrate surface surrounding the active region, such that, whatever the direction from which the radiation is incident upon the active region, its path through the device before arriving at the active region will have similar characteristics to the path the radiation takes upon leaving the active region.

2. A radiation sensor according to claim 1, wherein the body and the substrate are formed from semiconductor material having similar characteristics.

3. A radiation sensor according to claim 1, wherein material on opposite sides of the active region to be traversed by the radiation is substantially symmetrical in directions transverse and parallel to the surface of the substrate.

4. A radiation sensor according to claim 1, wherein the body has a thickness substantially equal to the thickness of the substrate and the body and the substrate are formed from semiconductor material having similar characteristics.

5. A radiation sensor according to claim 1, wherein the body has width and length significantly greater than width and length of the underlying active region.

6. A radiation sensor according to claim 1, wherein conductors connected to electrodes of the semiconductor device do not extend above or below the active region.

7. A radiation sensor according to claim 1, wherein the radiation sensor comprises at least one insulated gate field effect transistor.

8. A radiation sensor according to claim 1, wherein the radiation sensor comprises a pair of insulated gate field effect transistors.

9. A radiation sensor according to claim 1, wherein the semiconductor device comprises at least one diode.

10. A dosimeter probe comprising an elongate flexible conductor strip having a radiation sensor at one end, a connector at an opposite end, and a plurality of conductors connecting the radiation sensor to the connector, wherein the radiation sensor comprises an active semiconductor device fabricated upon a surface of a substrate attached to the flexible conductor strip and a body of semiconductor material positioned adjacent said surface but insulated therefrom by a thin film of insulating material, so as to overlie an active region of the semiconductor device, the body of semiconductor material being dimensioned to circumscribe the active region and an area of the substrate surface surrounding the active region, such that, whatever the direction from which the radiation is incident upon the active region, its path through the device before arriving at the active region will have similar characteristics to the path the radiation takes upon leaving the active region.

11. A dosimeter probe according to claim 10, wherein none of the conductors extend beneath the active region.

12. A dosimeter probe according to claim 10, wherein the body and the substrate are formed from semiconductor material having similar characteristics.

13. A dosimeter probe according to claim 10, wherein material on opposite sides of the active region to be traversed by the radiation is substantially symmetrical in directions transverse and parallel to the surface of the substrate.

14. A dosimeter probe according to claim 10, wherein the body has a thickness substantially equal to the thickness of the substrate and the body and the substrate are formed from semiconductor material having similar characteristics.

15. A dosimeter probe according to claim 10, wherein the body has width and length significantly greater than width and length of the underlying active region.

16. A dosimeter probe according to claim 10, wherein conductors connected to electrodes of the semiconductor device do not extend above or below the active region.

17. A dosimeter probe according to claim 10, wherein the radiation sensor comprises at least one insulated gate field effect transistor.

18. A dosimeter probe according to claim 10, wherein the radiation sensor comprises a pair of insulated gate field effect transistors.

19. A dosimeter probe according to claim 10, wherein the semiconductor device comprises at least one diode.

* * * * *